United States Patent [19]
Petty et al.

[11] Patent Number: 5,150,930
[45] Date of Patent: * Sep. 29, 1992

[54] CORRUGATED PIPE CONNECTOR AND METHOD OF MOLDING

[75] Inventors: John Petty, Bonnet Bay; Sandy McNeil, Hunters Hill, both of Australia

[73] Assignee: Elconnex Pty Limited, Bonnet Bay, Australia

[*] Notice: The portion of the term of this patent subsequent to May 8, 2007 has been disclaimed.

[21] Appl. No.: 668,706
[22] PCT Filed: Aug. 4, 1988
[86] PCT No.: PCT/AU88/00292
§ 371 Date: May 8, 1989
§ 102(e) Date: May 8, 1989
[87] PCT Pub. No.: WO89/01109
PCT Pub. Date: Feb. 9, 1989

Related U.S. Application Data

[63] Continuation of Ser. No. 342,515, May 8, 1989, abandoned, which is a continuation-in-part of Ser. No. 137,539, Nov. 17, 1987, Pat. No. 4,923,227.

[30] Foreign Application Priority Data

Aug. 4, 1987 [AU] Australia ................ PI3598

[51] Int. Cl.⁵ ............................... F16L 37/12
[52] U.S. Cl. .......................... 285/319; 285/921; 285/903; 285/423
[58] Field of Search .......... 285/319, 921, 903, 423

[56] References Cited

U.S. PATENT DOCUMENTS

| | | | |
|---|---|---|---|
| 4,441,745 | 4/1984 | Nicholas | 285/319 X |
| 4,542,922 | 9/1985 | Grossauer | 285/903 X |
| 4,575,133 | 3/1986 | Nattel | 285/319 |
| 4,711,472 | 12/1987 | Schnell | 285/319 X |
| 4,747,621 | 5/1988 | Gans et al. | 285/903 X |
| 4,902,048 | 2/1990 | Washizu | 285/319 |
| 4,913,473 | 4/1990 | Bonnema et al. | 285/903 X |
| 4,923,227 | 5/1990 | Petty et al. | 285/319 |

FOREIGN PATENT DOCUMENTS

| | | | |
|---|---|---|---|
| 964310 | 3/1875 | Canada | 285/903 |
| 2906317 | 8/1979 | Fed. Rep. of Germany | 285/903 |

Primary Examiner—Dave W. Arola
Assistant Examiner—Timothy Aberle
Attorney, Agent, or Firm—Townsend and Townsend

[57] ABSTRACT

A connector for corrugated pipes or rods includes a housing (2) having an open end (3) for insertion of a pipe or rod into a bore (5). A pair of resilient locking members or fingers (9) are formed in the housing wall and include projections (10) which extend into the bore (5). The projections are so shaped as to lock into a single valley of the pipe or rod corrugations to prevent withdrawal of the pipe or rod. Also disclosed are methods of molding the connector in which the fingers (9) are held and/or forced outwardly from the mold during withdrawal of a central core which forms the bore (5) to avoid damage to the fingers by the core.

22 Claims, 9 Drawing Sheets

CORRUGATED PIPE CONNECTOR AND METHOD OF MOLDING

This is a continuation of Ser. No. 07/342,515 filed May 8, 1989, now abandoned, which was a continuation-in-part of Ser. No. 07/137,539, filed Nov. 17, 1987, now U.S. Pat. No. 4,923,227.

The present invention relates to a connector for corrugated piping or conduit or piping having a ridge located adjacent its end and the method of forming such a connector or forming a hollow plastics article having a bore, with a recess or recesses in said article, and at least one finger positioned in said recess or recesses with a respective projection, extending into said bore and/or a recess in said finger facing the bore, and also to method of moulding a hollow object having a projection extending into the bore.

With existing corrugated flexible conduit for drainage or electrical work, available methods of joining involves encasing the joint and gluing to ensure an adequate join. This type of joint must be left, so that the glue or adhesive sets, to ensure a successful join. This takes the tradesman additional time, and the chemistry of the glue weakens the conduit and the connector cannot be reused.

The present invention seeks to ameliorate this problem by providing a push-on connector which provides a connection without the aid of adhesives, and which is reusable and adjustable during installation.

In one broad form the invention provides a one piece connector, for affixing to a conduit having at least one ridge or a recess located adjacent to its end, comprising:
a body open at one end to receive a conduit in a bore communicating with said open end;
a recess or recesses;
at least one finger formed in said recess or recesses, with a respective projection extending into said bore during use; said projection having retention means located on its face remote from said open end of said body to prevent the projection from riding out of engagement with said at least one ridge or recess when a withdrawal force is exerted on said conduit held in said connector, by causing said projection to be drawn deeper into engagement with said at least one ridge or recess.

In another form the invention comprises a one piece connector, for affixing to a conduit having at least one ridge or recess located adjacent to its end, comprising:
a body open at one end to receive a conduit in a bore communicating with said open end;
a recess or recesses;
at least one finger formed in said recess or recesses with a respective projection extending into said bore during use;
wherein said finger has a line of weakness to increase the forcing of the projection into engagement with said ridge or recess when a withdrawal force is exerted on said conduit held in said connector.

Preferably the recess or recesses are in communication with said bore.

Preferably the finger is axially extending away from the open end of the bore.

A sealing means can be provided to form a fluid tight seal between the connector and the conduit. This can be in the form of a resiliently deformable seal which is located in the bore to seal against (or adjacent the end,) of the conduit pushed into the bore, or at the open end of the bore where the recess is seated from said bore by flexible membranes joining the finger to the recess walls.

However, preferably, the sealing means is a tapered section of said bore which cooperates so as to both axially and radially compress the flexible conduit pushed into said bore.

The connector of the present invention can be utilised with any form of fittings, such as elbows, junctions, Y and T pieces, terminators, junction boxes, or fittings joining corrugated piping to rigid piping or corrugated piping to corrugated piping.

In a further form the invention comprises a method of moulding a hollow object having a bore with a recess or recesses in said article, and at least one finger positioned in said recess or recesses with a respective projection, extending into said bore and/or a recess in said finger facing the bore wherein during removal of the moulded article from the mould, the projection or projections which extend into the bore or the recesses in said finger facing into said bore are not engaged by and hence damaged by the core pin as it is withdrawn.

The recess could be a full cut-out communicating between the bore and the external surface of the article or the finger could be joined on its "free side" by flexible members to the articles body.

Preferably the finger or fingers, are held and/or forced outwardly from the mould during withdrawal of the centre core, such that the projection or projections which extend into the bore, or the recess or recesses in said finger facing into said bore, are not damaged by the core pin as it is withdrawn.

The present invention will now be described by way of example with reference to the accompanying drawings in which.

Figure 2A:
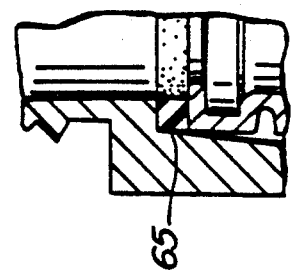
FIG. 2A is a partial view of the connector of FIG. 2 with a deformable seal shown adjacent the annular shoulder.
Figure 1:
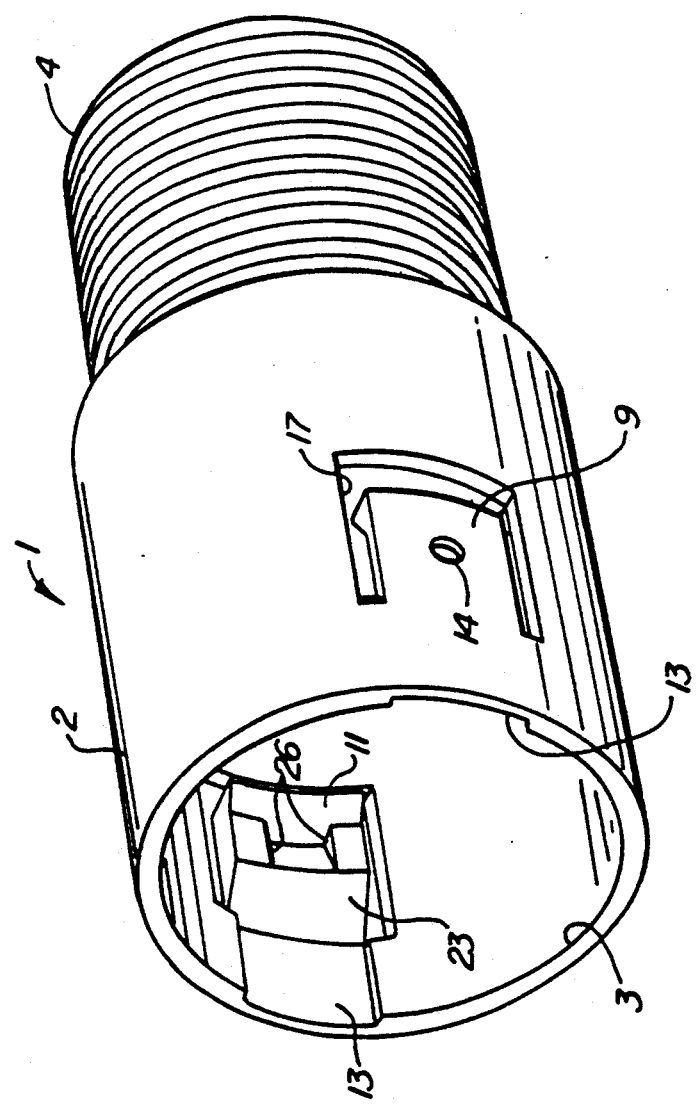
FIG. 1 illustrates a perspective view of a connector according to an embodiment of the present invention.
Figure 2:
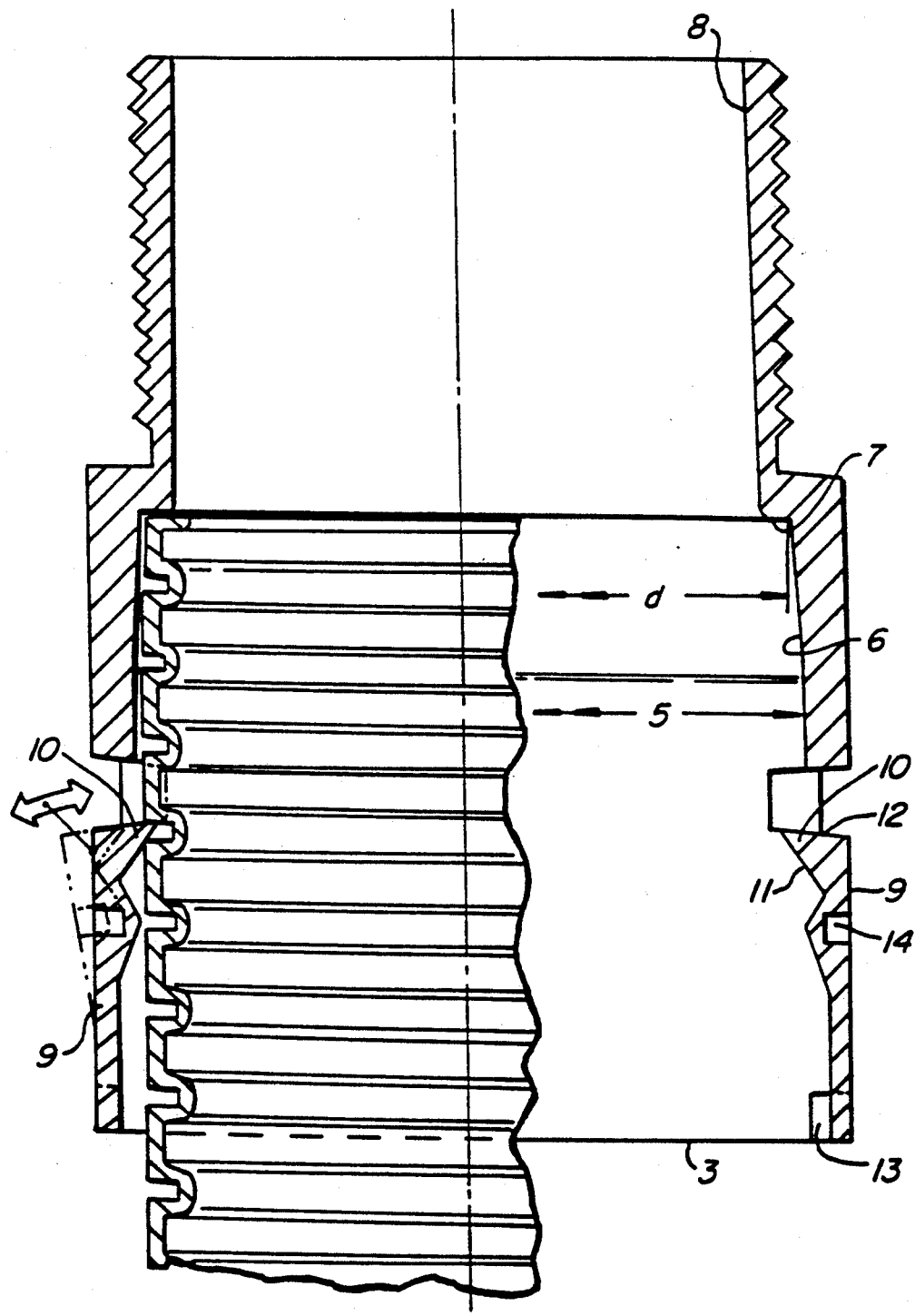
FIG. 2 illustrates a schematic sectional view of the connector illustrated in FIG. 1 with a corrugated conduit connected therein - for clarity sake, a gap is shown between the conduit and the tapered portion 6 and the shoulder 7 of the bore.
Figure 3:
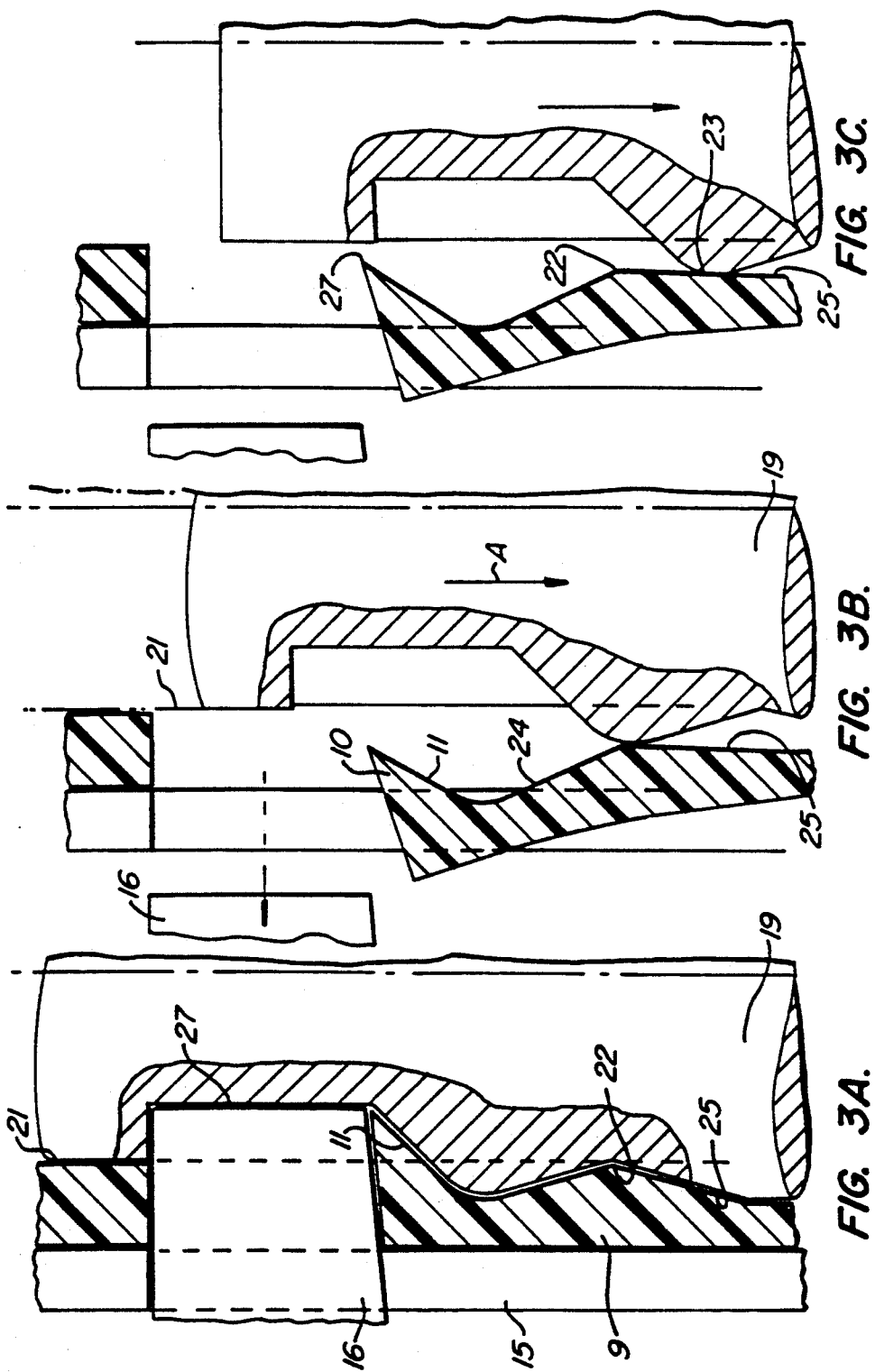
FIGS. 3a, 3b and 3c are part sectional schematic views illustrating steps in one embodiment of the method of moulding of the locking means of the embodiment shown in FIG. 1.

One embodiment of the present invention is illustrated in FIGS. 1 to 3 of the accompanying drawings. The connector 1 comprises a housing 2 having an open end 3 for insertion of the corrugated piping or piping having a single ridge to effect connection thereto. The other end 4 is shown for threaded connection to a junction box or the like. However, this end could be designed for any type of connection or fitting. The bore 5 (FIG. 2) is chosen so as to be slightly oversize to the outer diameter of the corrugated or threaded tubing or rod.

The bore 5 as shown in FIG. 2 has a tapered section 6 located, remote from the end 3 and terminating in an annular shoulder 7, with a smaller diameter bore 8, in communication therewith. The diameter of the bore 8 and the internal diameter of the conduit being substantially similar. The shoulder could be of any desirable width.

Located intermediate the ends of the bore, in the substantially constant diameter section, are two resilient locking members or fingers 9 formed in the walls of said bore 5, and having projections 10 which extend into the bore 5.

Thus, in clamping the connector 1 to a corrugated flexible piping as shown in FIG. 2, the piping is pushed into the bore 5; the projection 10 being so shaped that the corrugations bear on the ramp 11 and force the projection 10 back out of the bore as shown in ghosting. The piping is then pushed into the tapered section 6 where it may abut against the annular shoulder 7. As the piping is forced further into the tapered section 6, the piping may be radially compressed by the increasingly narrowing diameter of the tapered section, to form a fluid tight seal therewith, and is also axially compressed. Both the projections 10 lock into a single valley of the corrugations of the piping, such that the face 12 of the projection abuts up against a ridge of the corrugations, to prevent the piping from being withdrawn from the bore 5; the ridges, in this example, being in a fluid tight seal against the walls of the tapered section.

In another form of the invention the tapered section of the bore could be replaced by a resilient seal 65, shown in FIG. 2A, which abuts against the end of the conduit or against its walls to form a fluid tight seal or the resilient seal could be utilized as well as the tapered section described before.

Figure 4:
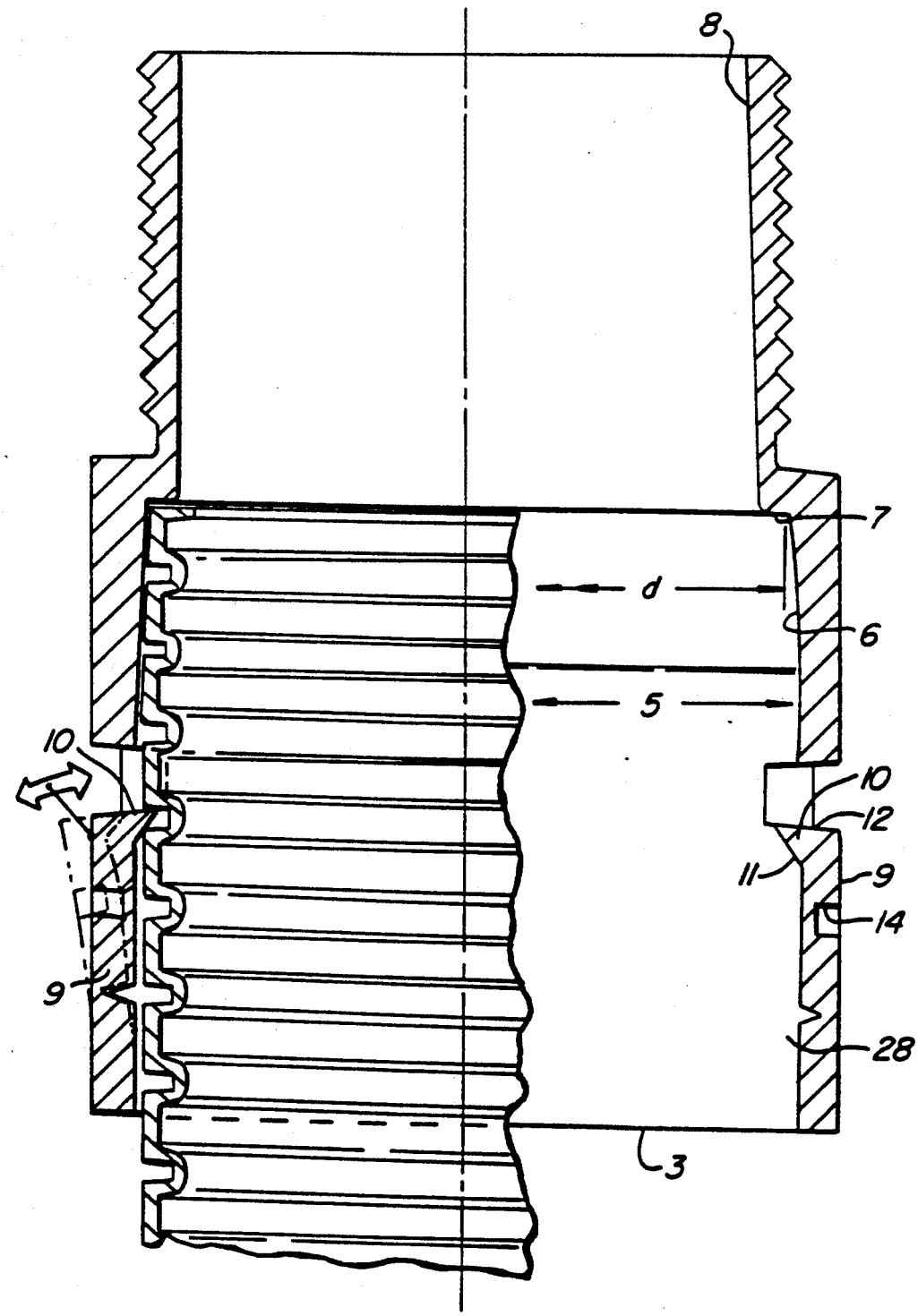
FIG. 4 illustrates a schematic sectional view of another embodiment of a connector showing a corrugated conduit connected therein.

To assist in the working of the locking members or fingers 9, the finger 9 could have a line of weakness 28, located internally as shown in FIG. 4, or externally (not shown), or a recess 13 as shown in FIGS. 1 and 2 which produces a thin walled section joining the locking members to the connector. This greatly increases the flexibility of the locking member, and produces a hinge at the end of or along the resilient member opposite the engagement tooth to increase the forcing of the tooth into engagement with the corrugations when a withdrawal force is exerted on said conduit held in said connector. The line of weakness could be of any desirable shape or size such as an arc or a straight line.

Additionally with the recess 13 as shown in FIG. 1 and 2 the centre of rotation of this hinge is moved further outwardly from the tooth or projection point, where the tooth engages the ridge in the conduit, thus increasing the length of the moment arm and enhancing the 'over centre' action, such that, if the conduit has been longitudinal compressed on insertion or it is attempted to be removed, the force of the corrugations on the face 12 produces a bending moment on the locking member, or finger, drawing the projection 10 deeper into the valley of the conduit, to resist withdrawal of the conduit from the connector.

Preferably as shown in FIG. 2 the leading face 12 of the projection 10 is angled inwardly away from the open end of the connector to prevent the projection 10 "riding" up the ridge of the corrugations, if a withdrawal force is applied to the conduit. This relief or inclination is equal to or greater than the maximum angle of inward bending of the finger.

Figure 5:
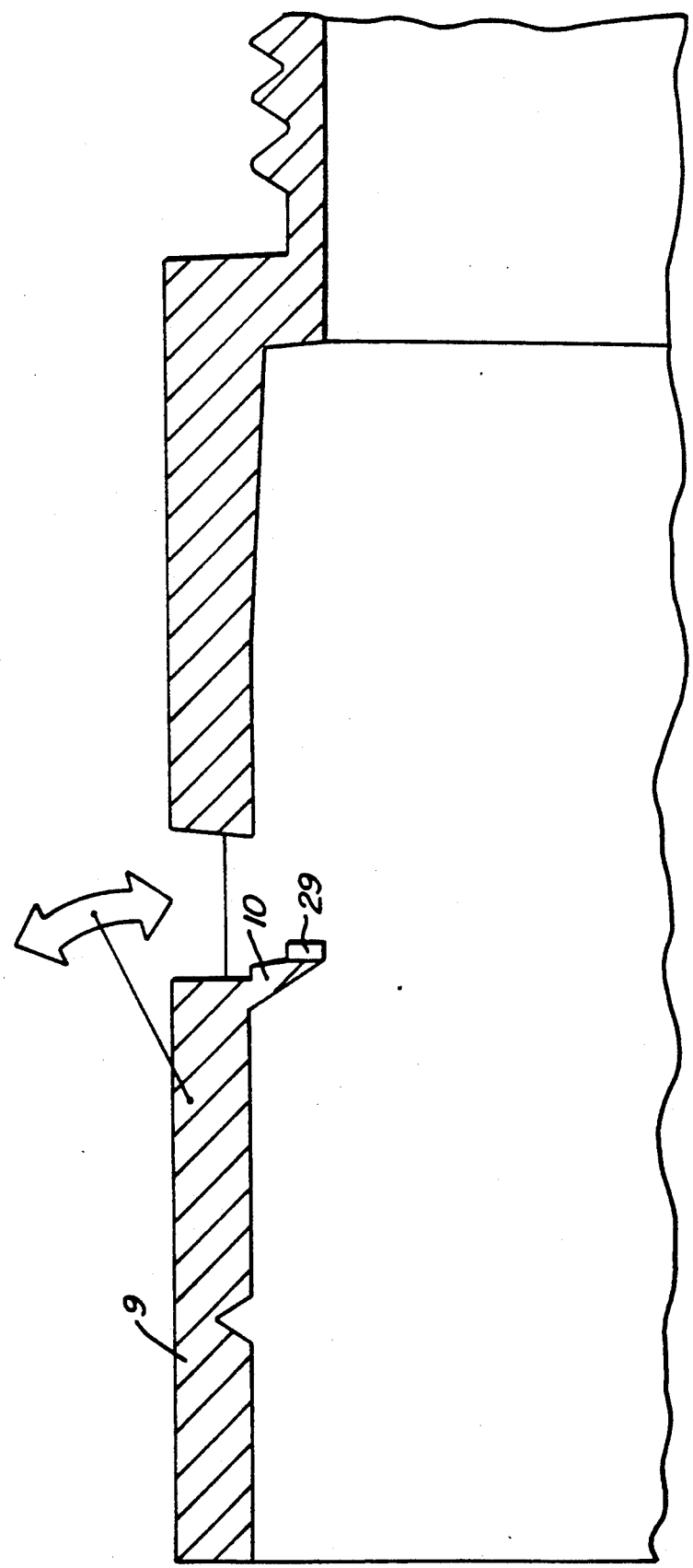
FIG. 5 is a part section schematic representation of another embodiment of the present invention, showing a different shaped projection.

However in another embodiment as shown in FIG. 5 the face of the projection remote from the open end 3 of the bore has a relief projection 29 which reacts with the corrugation to again prevent the projection 10 from "riding up" the tapered walls of the corrugated conduit. These forms could be used with or without the "line of weakness" embodiments described with reference to figures 1, 2 or 4.

With the above described locking means, the corrugated piping may be released by means of a suitable tool inserted in the opening 14 or inserted along the recess 13 to engage on the ramp 23, to force the projections out of the bore 5.

Another form of the invention utilising a transversely extending finger with the projection located on the side of the finger remote from the open end of the connector with a tapered surface equivalent to 11 in FIG. 2 facing the open end of the bore. The finger is so shaped that, if the conduit is attempted to be removed, the force of the corrugations on the projection produces a bending or twisting movement across the finger, drawing the projection deeper onto the valley of the corrugated conduit, so as to resist withdrawal of the conduit from the connector. This could occur as a result of a tapered profile or longitudinally tapering of the finger profile, inwardly to the sealing end of the connector. The transversely extending finger form could utilize the inwardly angled face 12 or the relief projection 29 described previously to assist in preventing withdrawal of the conduit from the connector.

The position of the projection 10 in said bore and its relationship with the tapered surface or resident seal or abutment is so chosen that it traps preferably between two to five compressed corrugations. This compression provides a back force to drag the projection 10 into engagement. Further this also allows for accommodation of a variety of style 5 or profiles or pitches of corrugations. Also, the use of two opposed fingers having their respective projections, which fall into the same valley of corrugations, together with axial compression and where a tapered 6 is utilized, radial compression, allows for accommodation of varied pitches of corrugations, and dimensional tolerance of component parts.

The present invention may be made from any suitable materials such as PVC or nylon, polypropolene, ABS, and can be used with pipes of varying sizes or types, for example, flexible plastic corrugated electrical conduit. The connector, as described above, can be utilised to form any desired connector, and could have any desired number of locking means as required.

The connector of the present invention could be moulded to a wall or a portion of a junction box, which wall or portion is releasably held in fluid tight relationship with the junction box, i.e. a groove and mating projection, or be able to be connected to a recess in a junction box by any suitable means, such as tapered swaged fit.

Because the connector in the preferred embodiment is a unitary plastics moulding, a special method of moulding was developed to allow for the formation of the locking members 9.

One embodiment of this method will now be described by way of example with reference to FIGS. 3a, 3b and 3c, which shows a part sectional view of one embodiment of the connector in the area of the locking member during moulding.

The external mould 15 comprises a separately movable side mould 16 or an integral projection 16 which forms the U-shaped cut-out or recess 17, as shown in FIG. 1. This projection mates with a recess in the internal mandrel or core 19, as shown in FIG. 3a, to form the locking member or finger 9.

In profile as shown in FIG. 3a, the projection 10 extends into the bore 5 beyond the wall thickness 21, with the ramp 11 tapering back beyond the wall thickness, and rising again to the apex 22 at the level of the wall thickness 21, where it forms a ramp 25 which slopes to the recess 13 (not shown). When the material of the thus moulded connector has sufficiently solidified, the external mould 15 and its projection 16 (which can be integral therewith or move independentally) are withdrawn as shown in FIG. 3b. The finger 9 has an undercut 26 as shown in FIG. 1 which is engaged by the core pin 19 to retain the finger 9 in position. As the cure pin 19 is withdrawn in the direction of arrow A as shown in FIG. 3b, the ridge 23 as it bears on the ramp 24 forces the locking member outwardly from the bore 5, such that when the ridge 23 of the core pin 19 bears on the apex 22, the projection 10 is well clear of the core pin 19. Engagement of the ridge 23 with the slope 25 of the locking member as shown in FIG. 3c prevents the projection 10 from interfering with the core pin 19 as it is removed from the bore 5. This thereby ensures that the leading edge 27 of the projection 10 is not damaged by the core pin 19.

The recess 13 (shown in FIG. 1) allows the retraction of the ridge 23 of the core pin 19 without distortion of the bore diameter.

The locking member or finger 9 can then return to its original "as moulded" position by "plastics memory" or can be forced mechanically back to this position. In fact the finger 9 can be shaped so as to be angled into the bore.

Rather than use the undercut 26 as shown in FIG. 1, the undercut could be a recess located on the ramp surface 11 of the projection 10.

To facilitate production of the dies the meeting surface 27 between the die projection 16 and the central cover 19 is formed as a plane in a chord of the diameter of the central core 19.

In a further embodiment the central core could be rotated whereby the central core disengages from the finger and, because of positioning of transversely extending or spiral ramps, force the finger outwardly as described with reference to FIGS. 3a to 3c.

This method would be particularly suited for transversely extending fingers.

Figure 6A:
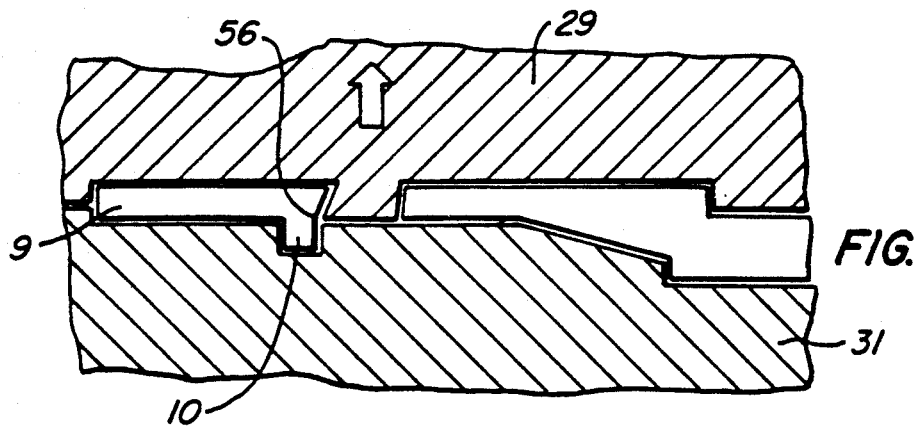
FIGS. 6a to 6c illustrate schematically a method according to further embodiment of the present invention, using reenterant surfaces to pull the finger free of the bore.
Figure 6B:
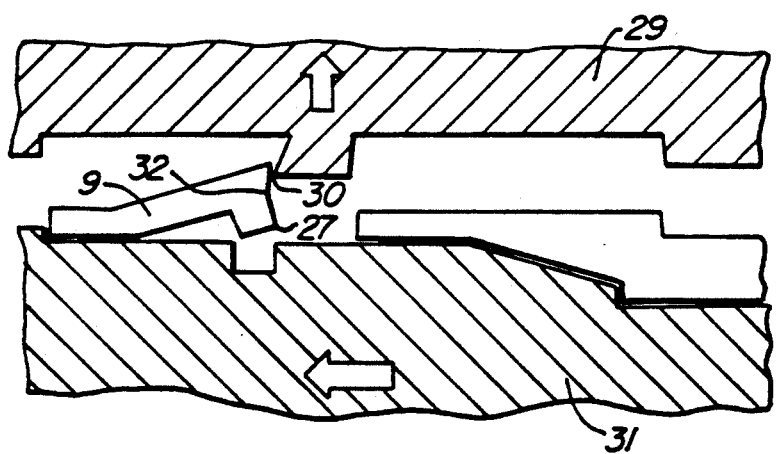
Figure 6C:
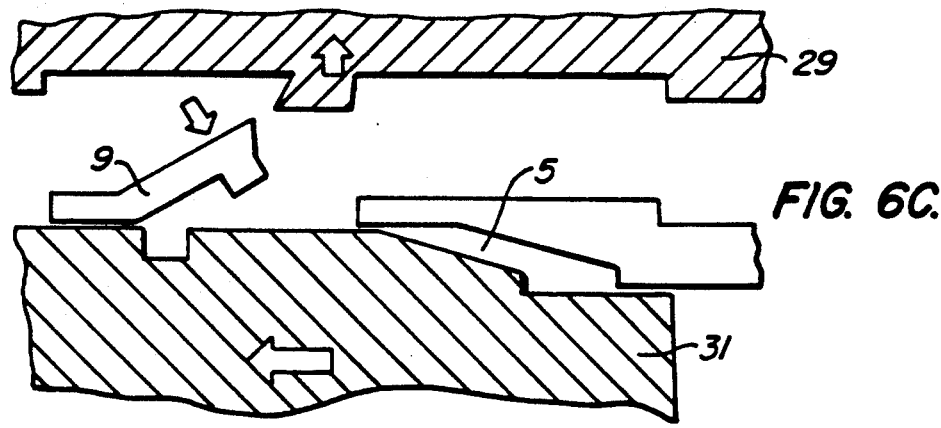

In a further embodiment of the method of the present invention as shown in FIGS. 6a to 6c, the fingers, which are shown schematically, could have an undercut 56 or be so shaped that they are pulled outwardly with the withdrawal of the side moulds 29, such that the central core can be withdrawn without damaging the tip of the projection 10.

The undercuts 56 could be located on the side or leading edges of the fingers 9, whereby as shown in FIG. 6b the side die 29 upon withdrawal engages by means of the tip 30 of the side core, the face 32 of the finger 9 and forces the finger away from the bore 5 such that the leading edge 27 is removed from the path of withdrawal of the central core 31, to prevent damage to the tip 27 whereby the side mould 29 releases the finger 9 or the finger 9 has frangible edges which break away freeing the finger as shown in FIG. 6c.

The projection 10 could be of any shape such as those described previously and have an appropriate "line of weakness" associated with the finger, but have been illustrated in FIGS. 6a to 6c and following figures in a basic shape for clarity of drawings.

Figure 7A:
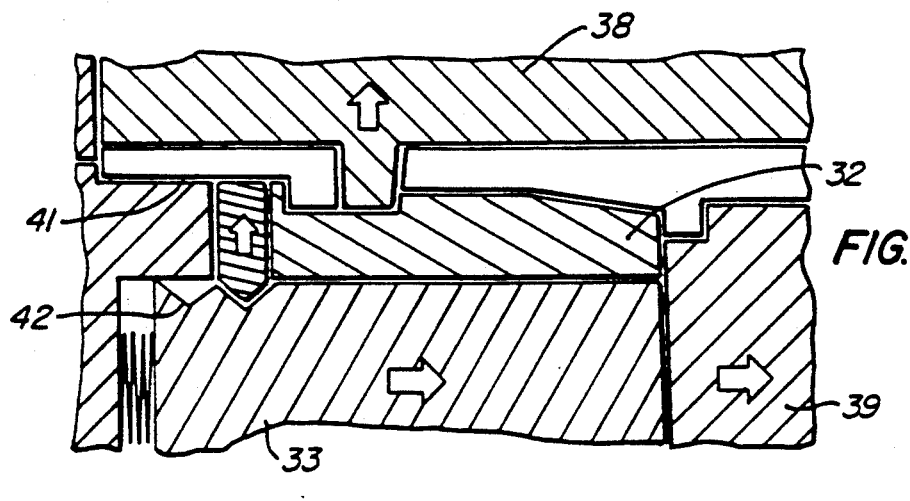
FIG. 7a to 7c illustrate a method according to a further embodiment of the present invention whereby the finger is pushed free of the bore.
Figure 7B:
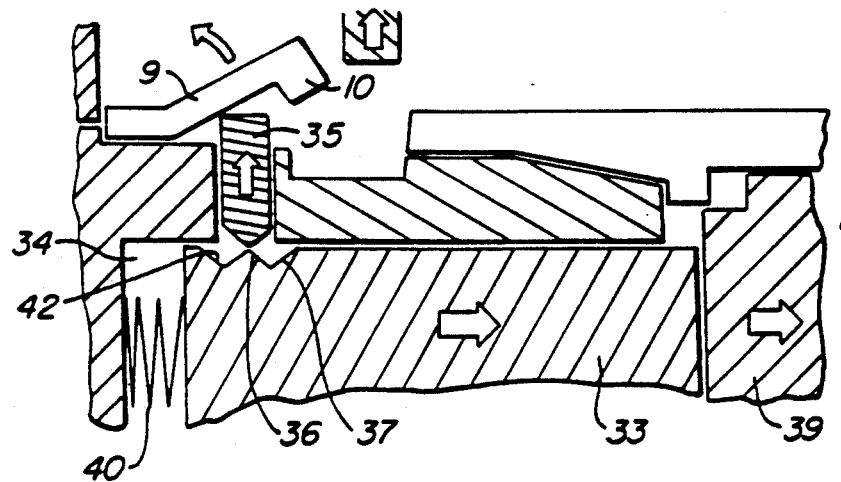
Figure 7C:
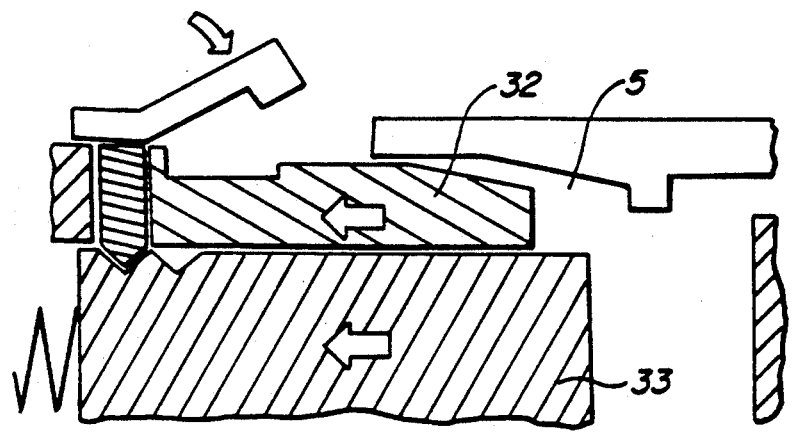

In a further embodiment, the method as shown in FIG. 7a to 7c utilises a means to push the finger or locking means 9 out of the bore 5 such that the central core 32 can be withdrawn without damaging the projection 10.

In this method the central core 32 comprises, a spring loaded centre member 33 which slideably moves in a central bore 34 of the central core 32. Located in the central core 32 are pins 35 which form part of the underside of the fingers 9. The pins are so shaped as to be raised by a cam shaped surface 36 of the centre member 33.

As shown in FIG. 7a the pin 35 sits within a complimentary recess 37 in the centre member 33. The side core 38 is removed after moulding as shown in FIG. 7b and as the stop core 39 is removed, the spring 40 forces the centre member 33 towards the withdrawing stop core 39. As this occurs the pin 35 rides up the cam surface 36 to stand proud of the moulding face 41 and force the finger 9 away from the bore 5.

As the centre member 33 moves further towards the stop core 39 the pin 35 rides down the cam surface 36 to engage in the recess 42 wherein the pin 35 lies level with or below the inner surface of the finger 9, as shown in FIG. 7c, whereby the entire central core 32 is withdrawn before the projection 10 is forceably returned or returns by "plastic memory" moving into the bore 5.

Preferably the pin 35 could be so shaped as to form the "line of weakness" across the finger 9 and the recess 42 would be of such a dimension that the portion of the pin 35 falls below the underside of the finger 9. This could be a flat recess or a sharp line of less thickness.

Again these figures 7a to 7c are schematic with the projection 10, shown as a block for clarity. The projection 10 could have any of the shapes as mentioned previously.

In yet a further form of production a collapsible central core could be used; two embodiments of which are shown in FIGS. 8a to 8c and 9a to 9c.

Figure 8A:
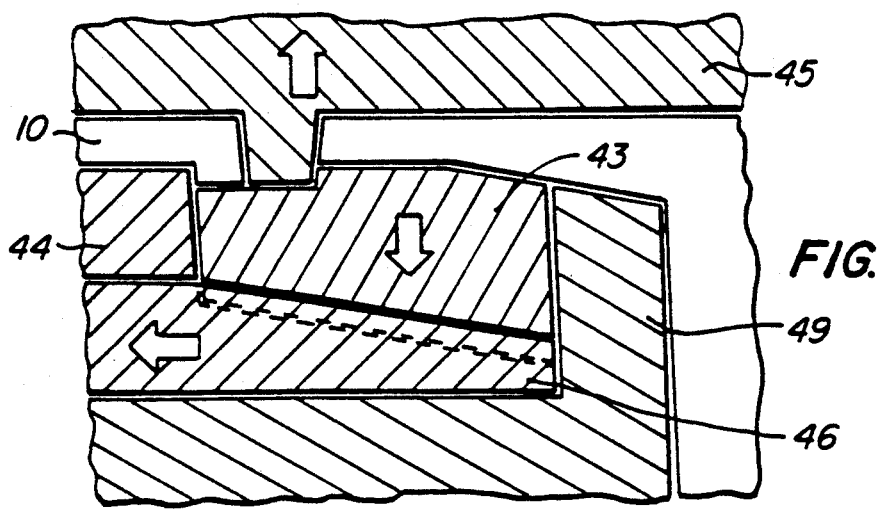
FIGS. 8a to 8c illustrates one form of collapsible core moulding according to one embodiment of the present invention.
Figure 8B:
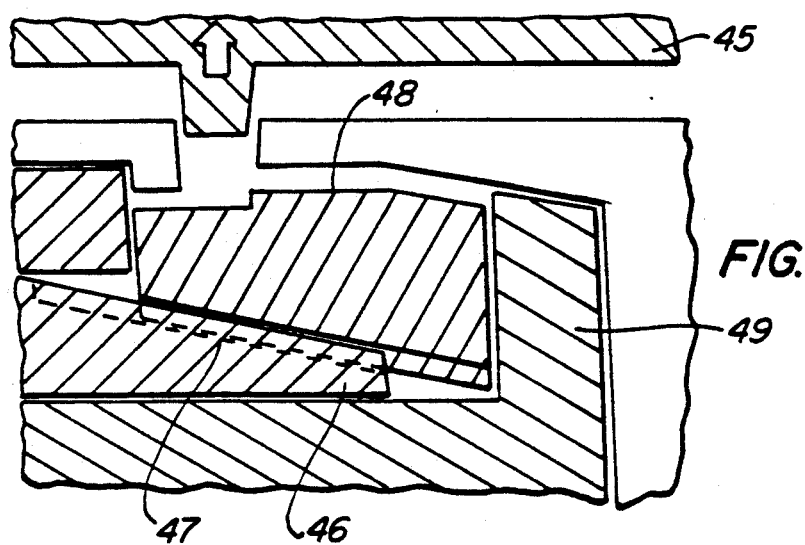
Figure 8C:
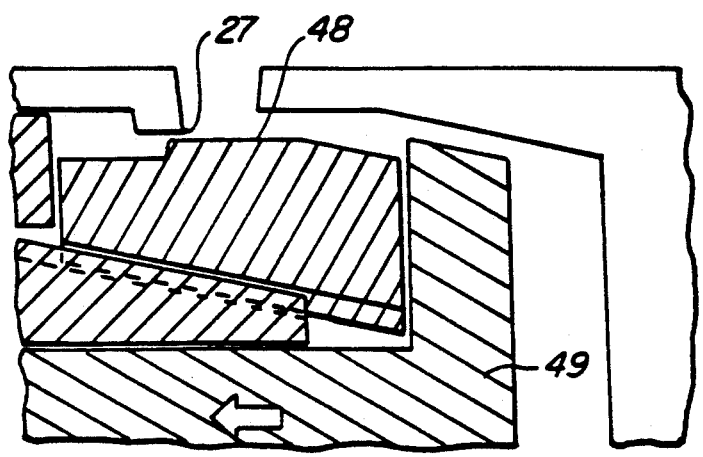

As shown in FIGS. 8a to 8c the side core as per the previous embodiments forms the recess around the free sides of the finger and engages with the centre core 43 and annular section 44 to form the required shape of projection 10 (FIG. 8a).

The side core 45 is withdrawn as shown in FIG. 8b and the sliding portion 46 commences withdrawal, whereby the centre core 43 slides down the ramped surface 47 of the sliding portion 46 where it is held by the major portion 49 such that the upper surface 48 lies below the projection 10.

Therefore as shown in FIG. 8c the major portion 49 of centre core is withdrawn without damaging the leading edge 27 of the projection 10.

The centre core 43 could be constructed to form a tapered projection 10 and a finger of tapered thickness to provide flexibility of the finger.

Figure 9A:
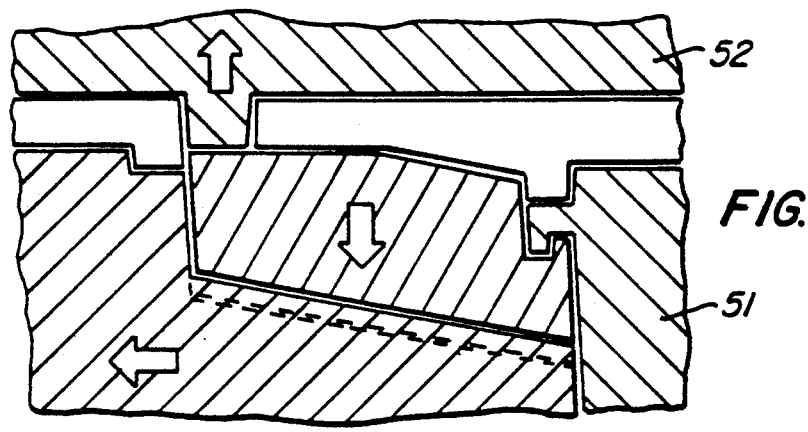
FIGS. 9a to 9c illustrates another embodiment of collapsible core moulding according to the present invention.
Figure 9B:
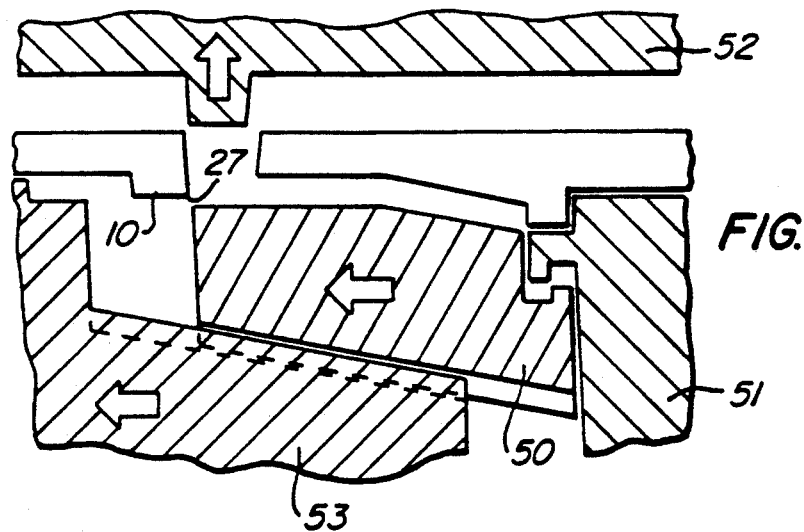
Figure 9C:
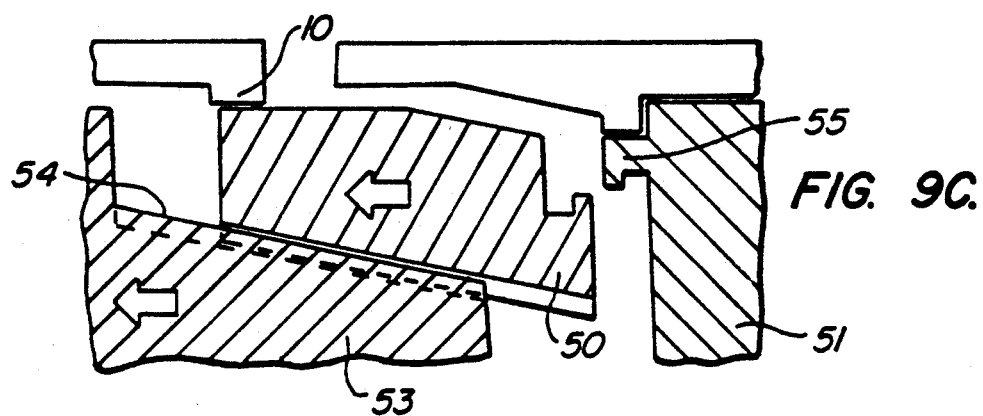

A further embodiment is shown in FIGS. 9a to 9c whereby the central core comprises a two-part construction adjacent the finger. In this case the slideable core portion 50 is connected by a hook means to the stop core 51. Upon the side core 52 being withdrawn as shown in FIG. 9b, the centre core 53 is withdrawn a distance as shown in FIG. 9b whereby the slideable core portion 50 being hooked to the stop core 51 slides down the ramped surface 54, until it falls below the level of the projection 10 where it is held by the centre core 53 and disengages from the hook means 55 of the stop core 51. The centre core 53 and captured slideable core portion 50 are withdrawn without damaging the levelling edge 27 of the projection 10.

It shall be obvious to people skilled in the art that the present invention could be used with corrugated conduit of any profile or could be used with non-corrugated pipes or rods having a ridge or a thread running around the pipe at a suitable distance from the end. The connector has applications for connection of electrical insulation piping, pool filtration and vacuum connections, vacuum cleaners, irrigation corrugated piping and lawn mower cable protection, drainage and waste water systems, plumbing and fluid reticulation systems, or optical fibre connection systems.

Further the methods described can be used to form a projection in a bore or a recess in the wall of said bore, such as a thread, annular recess, or any form of retention means.

We claim:

1. A one-piece plastic connector, for affixing, in a liquid tight manner, to a conduit, having a ridge located adjacent its end, comprising:
   a body open at one end to receive a conduit in a bore communicating with said open end;
   sealing means, in said bore, remote from said open end, which are adapted to seal against, in a liquid tight manner, the conduit pushed into the said bore; and
   locking means located in said body so as to project into the said bore so as to lock onto the ridge of conduit in said bore, so as to hold in said bore said conduit in a liquid tight seal against the said sealing means, wherein said locking means comprises:
   an axially extending resilient finger, having a projection located at its free end being remote from the open end and which projects into the bore; and
   an axially extending recess located in the bore, which extends from the base of the finger toward the open end, said recess acting to move the moment arm of the finger radially outwardly to enhance the over-center action of the finger;
   wherein a force attempting to withdraw the conduit from the connector causes the projection of the finger to more firmly and deeply resiliently engage and retain said ridge such that a greater withdrawal force results in a firmer and deeper engagement with said ridge.

2. A connector according to claim 1 wherein the finger has on its underside a ramp rising adjacent the projection from the finger to an apex, intermediate the ends of the finger.

3. A connector according to claim 2 wherein the apex extends into the bore a lesser distance than the projection.

4. A connector according to claim 1 wherein said projection has a substantially planar face, extending substantially radially to the bore and facing away from the open end of the body.

5. A connector according to claim 4 wherein said substantially planar face extends at an angle inwardly towards the interior of the bore and away from the open end of the body.

6. A connector according to claim 1 wherein said sealing means is a resiliently deformable seal adapted to abut against the end of the conduit in a liquid tight manner.

7. A one-piece plastic connector, for affixing, in a liquid tight manner, to a conduit, having a ridge located adjacent to its end, comprising:
   a body open at one end to receive a conduit in a bore communicating with said open;
   sealing means, in said bore, remote from said open end, which are adapted to seal against, in a liquid tight manner, the conduit pushed into the said bore; and
   locking means located in said body so as to project into the said bore so as to lock onto the ridge of conduit in said bore, so as to hold in said bore said conduit in a liquid tight seal against the said sealing means, wherein said locking means comprises an axially extending resilient finger, having a projection located at its free end being remote from the open end and which projects into the bore; and an axially extending recess located in the bore, which extends from the base of the finger towards the open end and is of a width substantially the same as that of the finger, said recess acting to move the moment arm of the finger radially outwardly to enhance the over-center action of the finger; wherein a force attempting to withdraw the conduit from the connector causes the projection of the finger to more firmly and deeply resiliently engage and retain said ridge such that a greater withdrawal force results in a firmer and deeper engagement with said ridge.

8. A connector according to claim 7 wherein said sealing means is a resiliently deformable seal adapted to abut against the end of the conduit in a liquid tight manner.

9. A connector according to claim 7 wherein said projection has a substantially planar face, extending substantially radially to the bore and facing away from the open end of the body.

10. A connector according to claim 7 wherein the finger has on its underside a ramp rising adjacent the projection from the finger to an apex, intermediate the ends of the finger.

11. A connector according to claim 10 wherein the apex extends into the bore a lesser distance than the projection.

12. A connector according to claim 9 wherein said substantially planar face extends at an angle inwardly towards the interior of the bore and away from the open end of the body.

13. A one-piece plastic connector, for affixing, to a conduit, having a ridge located adjacent its end, comprising:
   a body open at one end to receive a conduit in a bore communicating with said open end; and
   locking means located in said body so as to project into the said bore so as to lock onto the ridge of the conduit in said bore, so as to hold in said bore said conduit, wherein said locking means comprises:

an axially extending resilient finger, having a projection located at its free end being remote from the open end and which projects into the bore: and an axially extending recess located in the bore, which extends from the base of the finger toward the open end, said recess acting to move the moment arm of the finger radially outwardly to enhance the over-center action of the finger;

wherein a force attempting to withdraw the conduit from the connector causes the projection of the finger to more firmly and deeply resiliently engage and retain said ridge such that a greater withdrawal force results in a firmer and deeper engagement with said ridge.

14. A connector according to claim 13 wherein the finger has on its underside a ramp rising adjacent the projection from the finger to an apex, intermediate the ends of the finger.

15. A connector according to claim 13 wherein said projection has a substantially planar face, extending substantially radially to the bore and facing away from the open end of the body.

16. A connector according to claim 15 wherein said substantially planar face extends at an angle inwardly away from the open end of the body.

17. A connector according to claim 14 wherein the apex extends into the bore a lesser distance than the projection.

18. A one-piece plastic connector, for affixing, to a conduit, having a ridge located adjacent to its end, comprising:

a body open at one end to receive a conduit in a bore communicating with said open end:

locking means located in said body so as to project into the said bore so as to lock onto the ridge of conduit in said bore, so as to hold in said bore said conduit, wherein said locking means comprises an axially extending resilient finger, having a projection located at its free end being remote from the open end and which projects into the bore; and an axially extending recess located in the bore, which extends from the base of the finger towards the open end and is of a width substantially the same as that of the finger, said recess acting to move the moment arm of the finger radially outwardly to enhance the over-center action of the finger; wherein a force attempting to withdraw the conduit from the connector causes the projection of the finger to more firmly and deeply resiliently engage and retain said ridge such that a greater withdrawal force results in a firmer and deeper engagement with said ridge.

19. A connector according to claim 18 wherein the finger has on its underside a ramp rising adjacent the projection from the finger to an apex, intermediate the ends of the finger.

20. A connector according to claim 18 wherein said projection has a substantially planar face, extending substantially radially to the bore and facing away from the open end of the body.

21. A connector according to claim 20 wherein said substantially planar face extends at an angle inwardly away from the open end of the body.

22. A connector according to claim 19 wherein the apex extends into the bore a lesser distance than the projection.

* * * * *